United States Patent
Haenel et al.

(10) Patent No.: US 8,904,368 B2
(45) Date of Patent: Dec. 2, 2014

(54) INSTANTIATING A COMPOSITE APPLICATION FOR DIFFERENT TARGET PLATFORMS

(75) Inventors: Walter Haenel, Holzgerlingen (DE); Stefan Hepper, Holzgerlingen (DE); Thomas Stober, Boblingen (DE)

(73) Assignee: International Business Machines Corporation, Armonk, NY (US)

(*) Notice: Subject to any disclaimer, the term of this patent is extended or adjusted under 35 U.S.C. 154(b) by 1678 days.

(21) Appl. No.: 12/059,654

(22) Filed: Mar. 31, 2008

(65) Prior Publication Data

US 2009/0249296 A1    Oct. 1, 2009

(51) Int. Cl.
*G06F 9/45* (2006.01)
*G06F 9/445* (2006.01)
*G06F 9/44* (2006.01)

(52) U.S. Cl.
CPC ........ *G06F 9/44547* (2013.01); *G06F 9/44536* (2013.01); *G06F 8/61* (2013.01); *G06F 8/71* (2013.01)
USPC ............................ 717/147; 717/148; 717/177

(58) Field of Classification Search
CPC ............. G06F 8/447; G06F 8/61; G06F 8/76; G06F 17/3089
See application file for complete search history.

(56) References Cited

U.S. PATENT DOCUMENTS

| | | | |
|---|---|---|---|
| 6,823,522 B1* | 11/2004 | Lamb | 719/316 |
| 7,266,817 B1* | 9/2007 | Barrett | 717/174 |
| 7,739,310 B1* | 6/2010 | Shmulevich et al. | 707/802 |
| 7,774,791 B1* | 8/2010 | Appelbaum et al. | 719/318 |
| 2004/0098704 A1* | 5/2004 | Becker et al. | 717/115 |
| 2004/0187140 A1* | 9/2004 | Aigner et al. | 719/328 |
| 2004/0250238 A1* | 12/2004 | Singh et al. | 717/108 |
| 2005/0144226 A1* | 6/2005 | Purewal | 709/203 |
| 2006/0036993 A1* | 2/2006 | Buehler et al. | 717/104 |
| 2006/0085520 A1* | 4/2006 | Allamaraju et al. | 709/218 |
| 2006/0106626 A1* | 5/2006 | Jeng et al. | 705/1 |
| 2007/0033196 A1 | 2/2007 | Moore | |
| 2007/0106976 A1* | 5/2007 | Facemire et al. | 717/106 |
| 2007/0234282 A1 | 10/2007 | Prigge et al. | |
| 2007/0250629 A1 | 10/2007 | Blanding et al. | |
| 2007/0283020 A1* | 12/2007 | Chowdary et al. | 709/227 |
| 2008/0022257 A1* | 1/2008 | Baartman et al. | 717/106 |

(Continued)

OTHER PUBLICATIONS

"A Web Services-Based Interface for an Information Portal Platform," by Ge, Jing. In: Thesis/Dissertation for Technical University Hamburg-Harbug (2003). Available at: http://www.sts.tu-harburg.de/people/pa.hupe/studenttheses/GeDA.pdf.*

*Primary Examiner* — Daniel Kinsaul
(74) *Attorney, Agent, or Firm* — Yudell Isidore PLLC; Raymond Szeto (57) ABSTRACT

A method, system, and computer program product for instantiating a composite application for different target platforms. In an exemplary manner, a template that describes a composite application having a plurality of application components is created. The template includes a composite application component assembly descriptor and a plurality of platform-specific handlers. The composite application component assembly descriptor lists each application component of the composite application. The platform-specific handlers handle the deployment of application components for the different target platforms. The composite application component assembly descriptor is evaluated to identify platform-specific implementations of the composite application components. The composite application is instantiated using one of the plurality of platform-specific handlers. The platform-specific handlers are included in the template for a platform-specific deployment for one of the plurality of target platforms.

9 Claims, 4 Drawing Sheets

(56) References Cited

U.S. PATENT DOCUMENTS

| | | | |
|---|---|---|---|
| 2008/0046421 A1* | 2/2008 | Bhatia et al. | 707/5 |
| 2008/0091448 A1* | 4/2008 | Niheu et al. | 705/1 |
| 2008/0127169 A1* | 5/2008 | Malasky et al. | 717/174 |
| 2008/0127170 A1* | 5/2008 | Goldman et al. | 717/174 |
| 2009/0113379 A1* | 4/2009 | Sedukhin et al. | 717/104 |

* cited by examiner

INSTANTIATING A COMPOSITE APPLICATION FOR DIFFERENT TARGET PLATFORMS

BACKGROUND OF THE INVENTION

The present disclosure relates to computer runtime systems, and specifically composite applications implemented in computer runtime systems.

The process of building complex business logic using a set of components, such as portlets, can be a tedious endeavour. First, individual components are deployed sequentially. Then, the deployed individual components are arranged on a customer's staging system as desired. Finally, component interaction and access control are defined according to the business logic to be implemented. The above steps require active involvement of application developers, portal administrators and persons with the necessary business domain skills.

To simplify the aforementioned process, composite applications, such as composite portal applications (or portal server applications), were introduced as a key strategy for implementing meaningful business value within a Service Oriented Architecture (SOA). Composite portal applications provide a flexible framework to produce very complex websites with reasonable effort. The basic functional units of a composite portal application are application components (or portlets, when specifically referring to the functional units of a composite portal application). The composite portal application aggregates the output of the individual portlets to an output which can be rendered in a browser. This aggregation of content is an important feature of composite portal applications, since the composite portal application effectively integrates the user interface (UI) of independent portlets without the need to write any integration code.

Business analysts and application designers can leverage composite applications to assemble complex business logic easily from individual application components, such as JAVA® classes (JAVA® is a registered trademark of Sun Microsystems, Inc., portlets, Enterprise JAVA® Beans (EJBs) (EJB is a trademark or registered trademark of Sun Microsystems, Inc.), processes, Plain Old JAVA® Objects (POJOs), or other code artifacts. Portals expose a user to multiple services in a single interface. Composite applications allow the user to interact with these multiple services. Composite applications do away with multiple User Interfaces (UIs) and permit improved data connectivity. Composite applications achieve this by making functionality and data independent from an architecture. As a result, users can, on their own, define, create and manage composite portal applications. The use of a composite application delivery model emphasizes a move towards a strongly business-driven usage model with plug-ability and fewer dependencies on support by system administrators.

Modern composite portal applications typically have a considerable number of application components. Furthermore, application components can be added to an existing aggregation of application components to produce even more sophisticated composite applications. Each application component in the aggregation must be executable on the designated target system to which the composite portal application is deployed. One example of a target system is the JAVA® Platform, Enterprise Edition (J2EE), which provides a programming platform for developing and running distributed multi-tier architecture JAVA® applications. However, other target systems are conceivable as well. A complex composite portal application comprises manifold application component types, which are all suited together in a coherent composite application produced by a large application development team.

U.S. Published Patent Application US2006/0036993 A1 describes a system and method for developing a composite portal application by creating a portal application archive, and for automatically deploying the portal application archive into a portal server environment. A portal application is a specific type of application. In particular, a portal application is a collection of pages, portlets, policies, and roles. According to an embodiment of the method in accordance with the above mentioned document, a composite portal application is provided to a portal server environment as a portal application archive. The portal application archive includes (i) all application components in machine-readable code for forming the composite portal application, and (ii) an application component assembly descriptor in machine readable code that specifies how the application components need to be assembled such that the composite portal application is correctly deployed into the portal server environment.

In order to deploy the composite portal application into the portal server environment, the portal application archive is provided to a deployment mechanism within the portal server application environment. The deployment mechanism enables the deployment of the portal application archive into the portal server environment. Further, the application component assembly descriptor included in the portal application archive is evaluated by means of the deployment mechanism. The application components are automatically deployed into respective parts of the portal server application environment according to information included in the application component assembly descriptor.

The application component assembly descriptor can be implemented in the form of an Extensible Markup Language (XML) descriptor file and includes meta-data that describe how each particular application component of the composite portal application is to be used within the composite portal application. Each piece of meta-data is evaluated accordingly via the deployment mechanism described above. The meta-data provided by the application component assembly descriptor therefore provides added value for the composite application with respect to the standard JAVA® J2EE. While JAVA® supports coding, deployment, and life cycle aspects of composite portal applications, the meta-data can be regarded as comprising the logic focus description language on top of JAVA® and can be implemented in the form of XML.

However, there are several limitations to the current state of the art. First, the packaging of a composite application includes the implementation of the application components, as well as the component assembly descriptor. Second, a composite application needs to be developed for a specific target hardware and software platform. Thus, current implementations fail to provide a generic composite application package that can be installed, executed, and managed on various target platforms. There are several different target platforms/frameworks/runtime environments that require a particular instantiation of the composite application. Such target platforms/frameworks include, but are not limited to Rich Client (e.g., WebSphere® (WebSphere is a registered trademark of IBM) Everyplace Deployment (WED), which is based on Eclipse™ (a trademark of Eclipse Foundation) Application Programming Interfaces (APIs)), Portal Servers (e.g., WebSphere® Portal, which is based on portlet components and J2EE Portlet APIs), IBM Lotus Domino (e.g., Lotus Notes C/C++ APIs), Microsoft .NET environment (Microsoft and .NET are trademark of Microsoft, Corp.), and Mobile Devices.

Moreover, the layout architecture and the runtime APIs against which the application components are implemented, differ greatly between target platforms. For example a Rich Client target platform requires application components to program against Eclipse APIs. In contrast, a Portal Server target platform requires application components to program against the J2EE Portlet APIs (e.g., according to JAVA® Specification Request (JSR) 168). Since each target platform has a different application component lifecycle management model, the application components require a different handler for each target platform to implement the application component's life cycle. Each target platform is expected to have the necessary handler pre-deployed. For instance, a Rich Client target platform exploits the Open Services Gateway initiative (OSGi) Alliance as an application component management model. Moreover, a Portal Server target platform is based on a WebSphere Application Server (WAS)/J2EE deployment frameworks.

Thus, during deployment/distribution of the composite application to the various target platforms, the application components only get installed on a specified target platform for which the packaged application components have been developed and the requisite handler has been pre-deployed to the target platform. This limitation prevents the same composite application from being installed on other target platforms that lack the requisite handlers.

SUMMARY OF THE ILLUSTRATIVE EMBODIMENTS

In view of the foregoing, a method, system, and computer program product for instantiating a composite application for one of a plurality of different target platforms are disclosed. A template that describes a composite application having a plurality of application components is created. The template includes a composite application component assembly descriptor and a plurality of platform-specific handlers. The composite application component assembly descriptor lists each application component of the composite application. The platform-specific handlers handle the deployment of application components for the different target platforms. The composite application component assembly descriptor is evaluated to identify platform-specific implementations of the composite application components. The composite application is instantiated using one of the plurality of platform-specific handlers. The platform-specific handlers are included in the template for a platform-specific deployment for one of the plurality of target platforms.

All objects, features, and advantages of the present invention will become apparent in the following detailed written description.

BRIEF DESCRIPTION OF THE DRAWINGS

Aspects of the invention itself will best be understood by reference to the following detailed description of an illustrative embodiment when read in conjunction with the accompanying drawings, where.

DETAILED DESCRIPTION OF THE DRAWINGS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as JAVA®, Smalltalk® (SMALLTALK is a trademark or registered trademark of Cincom Systems, Inc.), C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
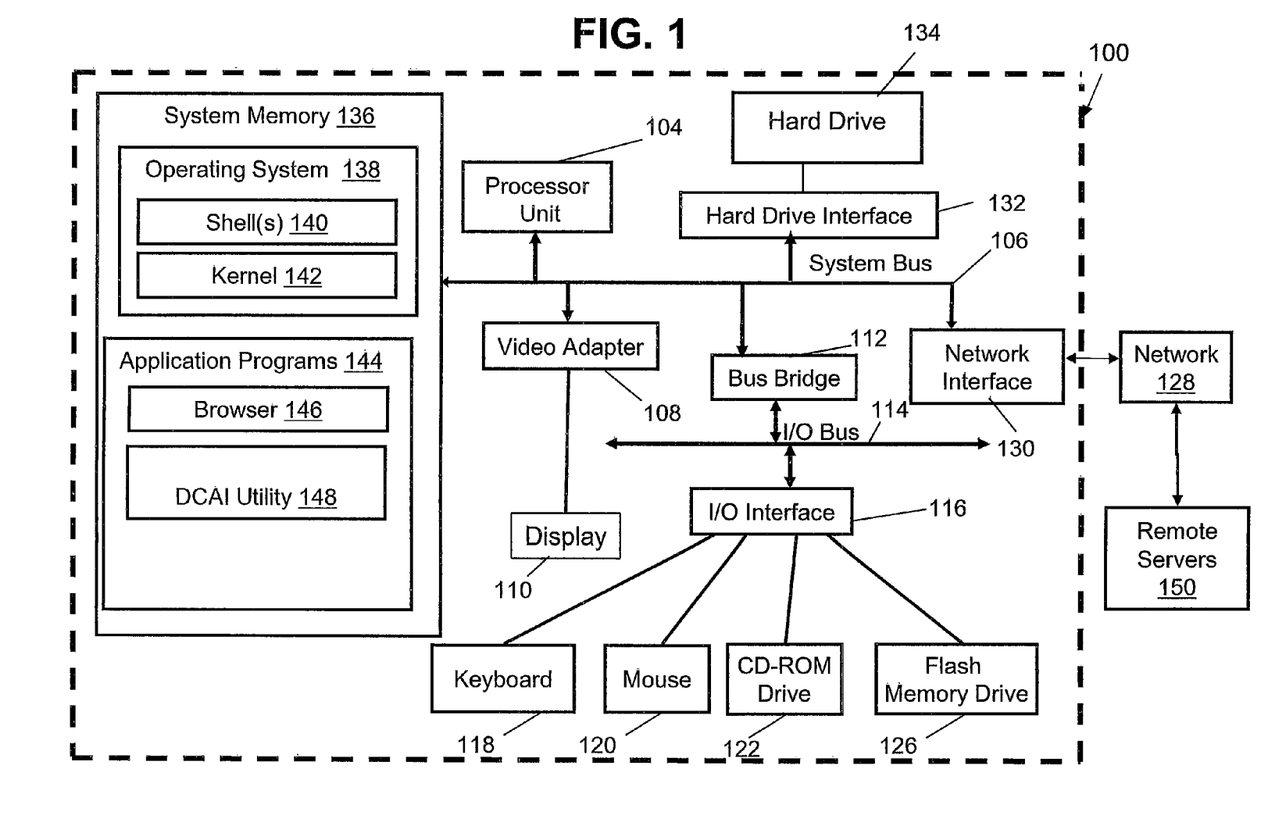
FIG. 1 depicts an exemplary computer in which the present invention may be implemented.

With reference now to the figures, and in particular to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a remote server 150 via a network 128 using a network interface 130, which is coupled to system bus 106. Network 128 may be an external network such as the Internet, or an internal network such as an Ethernet or a Virtual Private Network (VPN). Remote server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX® (UNIX is a registered trademark of The Open Group in the United States and other countries)) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with remote server 150. Application programs 144 in system memory 136 also include a Dynamic Composite Application Instantiation (DCAI) Utility 148. DCAI utility 148 performs the functions illustrated below in FIG. 4, and may include all logic, helper functions, databases and other resources depicted below in FIGS. 2-3. DCAI utility 148 processes electronic signals from a multitude of sources, such as remote server 150 in network 128, as well as from other application programs 144.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
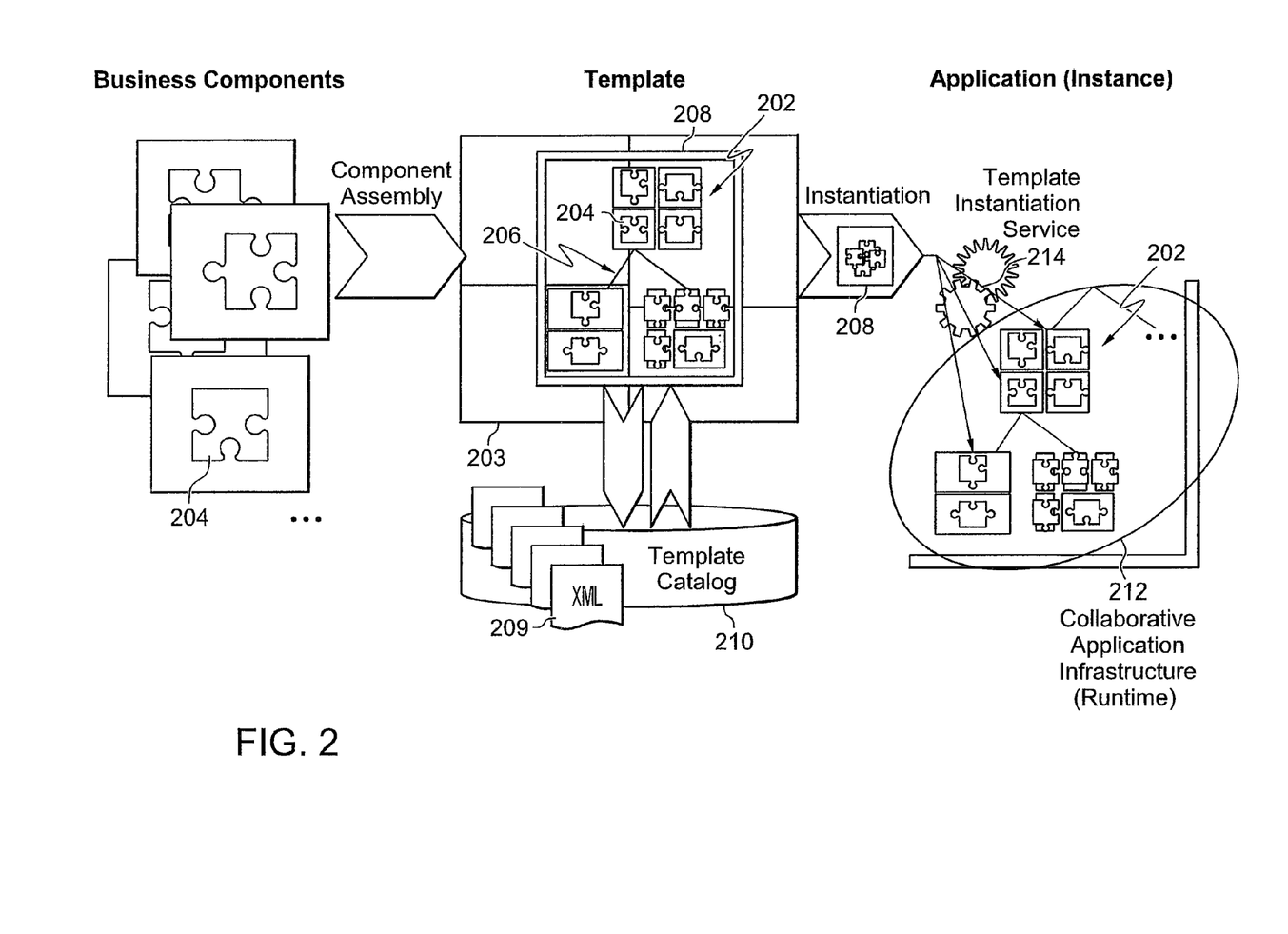
FIG. 2 is an exemplary illustration that represents how one or more instances of a composite application are created, according to an embodiment of the present invention.

Referring now to FIG. 2, exemplary illustration 200 shows how one or more instances 202 of composite applications 203 are created, according to one embodiment that is useful for understanding the invention. Composite applications aggregate a set of application components 204 (e.g., business components) into a single, coherent entity. Individual application components 204 and the interactions (indicated by arrow 206) among these application component(s) 204 work together to implement complex logic (e.g., business logic) as defined by an end-user (e.g., business user). Examples of application components 204 of composite application 203 include, but are not limited to, JAVA® classes, portlets, Enterprise JAVA® Beans (EJBs), processes, Plain Old JAVA® Objects (POJOs), or other code artifacts.

Composite applications involve template 208. Template 208 describes a composite application in an abstract way (i.e., a "blueprint" for composite application 203). Template 208 includes information that defines how complex logic is assembled out of a given set of application components 204. In most cases, template 208 is an XML file 209 that references all applicable application components 204. Additionally, template 208 specifies meta-data (e.g., such as specific configuration settings) for each application component 204. Template 208 describes the behavior of composite application 203 and to define the desired interaction between application components 204 (e.g., wires between portlets). Moreover, template 208 defines which desired access control logic is to be enforced, such as application-specific user roles. Template 208 is also used to exchange composite application definitions between different runtime target platform systems. After creating template 208, template 208 is stored in template catalog 210 and made available to a user community.

Using defined template 208, a user can create one or more instances 202 (or application instances) of composite application 203. The user selects template 208 (e.g., template XML file 209) from template catalog 210 and creates one or more instances 202 of composite application 203 based on a definition of template 208. The instances 202 run within application runtime target platform system, which is referred to as Collaborative Application Infrastructure (CAI) 212. Thus, each end-user manages his/her particular instance 202 of composite application 203, without having the need for administrative authority. A set of tools are used to enable end-users to assemble and manage business logic from individual application components 204 that can include, for example, portlets, processes, or other code artifacts.

Moreover, FIG. 2 shows how business components 204, template 208, and composite application instances 202 relate to each other. Template 208 is assembled from business components 204 and stored as an XML description file 209 in template catalog 210. Template instantiation service 214 creates (or instantiates) one or more application instances 202 in CAI 212. It should be appreciated by persons of ordinary skill in the art that the particular standard that is used to describe template 208 can vary from the example using XML. Other standards that can be used to describe the various business components 204 include, but are not limited to Common Object Request Broker Architecture (CORBA) and JAVA®. The functionality of each application component 204 is described.

Figure 3:
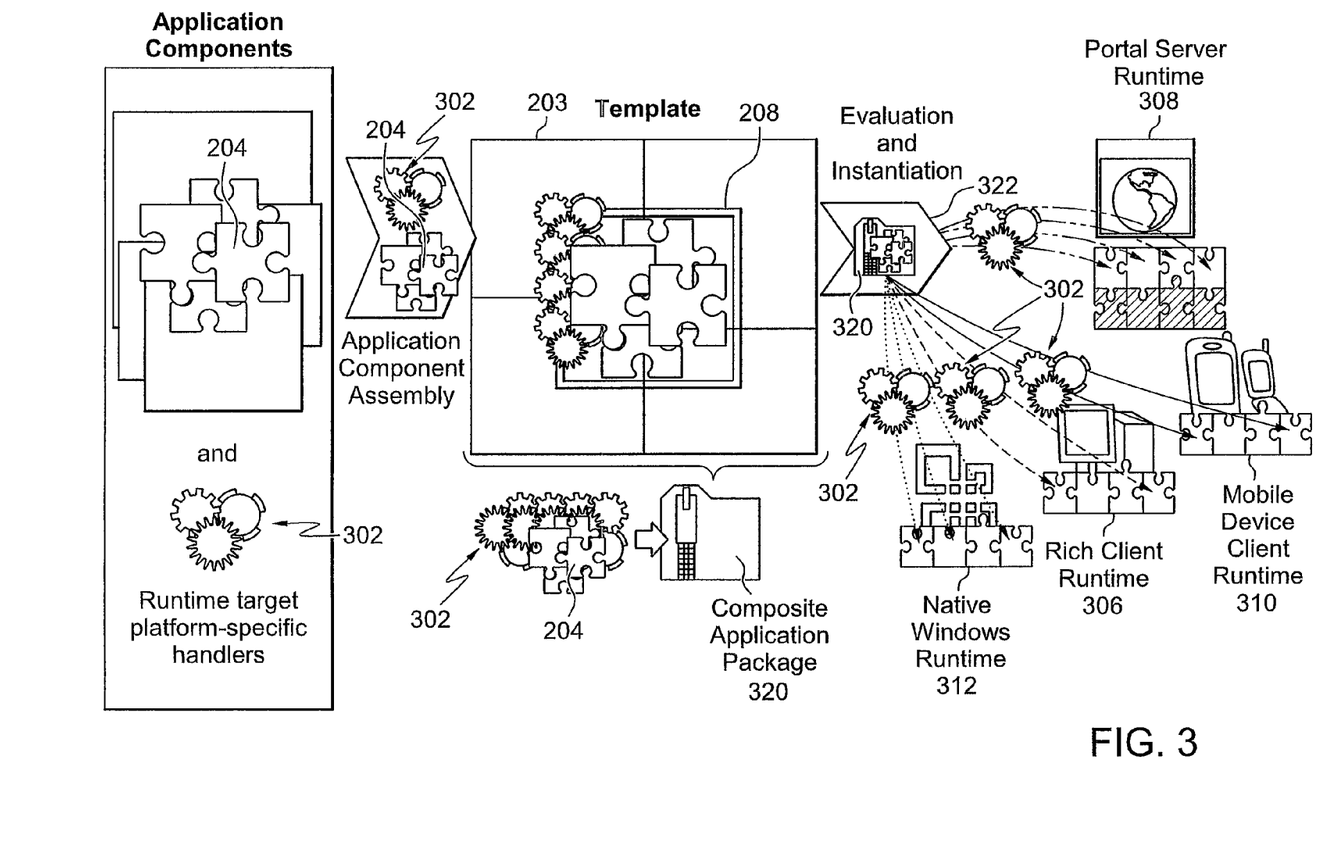
FIG. 3 is an exemplary illustration that represents the instantiation of composite application that is described by a template, which is adapted for multiple, different runtime target platforms, according to an embodiment of the present invention.

With reference now to FIG. 3, shown is an exemplary illustration 300 that represents the instantiation of composite application(s) 203 that is/are described by template 208, whereby template 208 is adapted for multiple, different runtime target platforms (or target platforms). According to the example shown in FIG. 3, a target platform is, but is not limited to Rich Client 306, Portal Server 308, Mobile Device 310, and Native Windows 312 target platforms. Exemplary illustration 300 includes composite application package 320 (or composite application archive) having template 208. Template 208 includes a composite application component assembly descriptor in machine-readable code that lists each application component 204 of composite application 203. Moreover, template 208 includes one or more platform-specific handlers 302 (or runtime target platform-specific handlers) to install and/or manage application components that are deployed via deployment mechanism 322 to designated runtime target platform 306-312.

Figure 4:
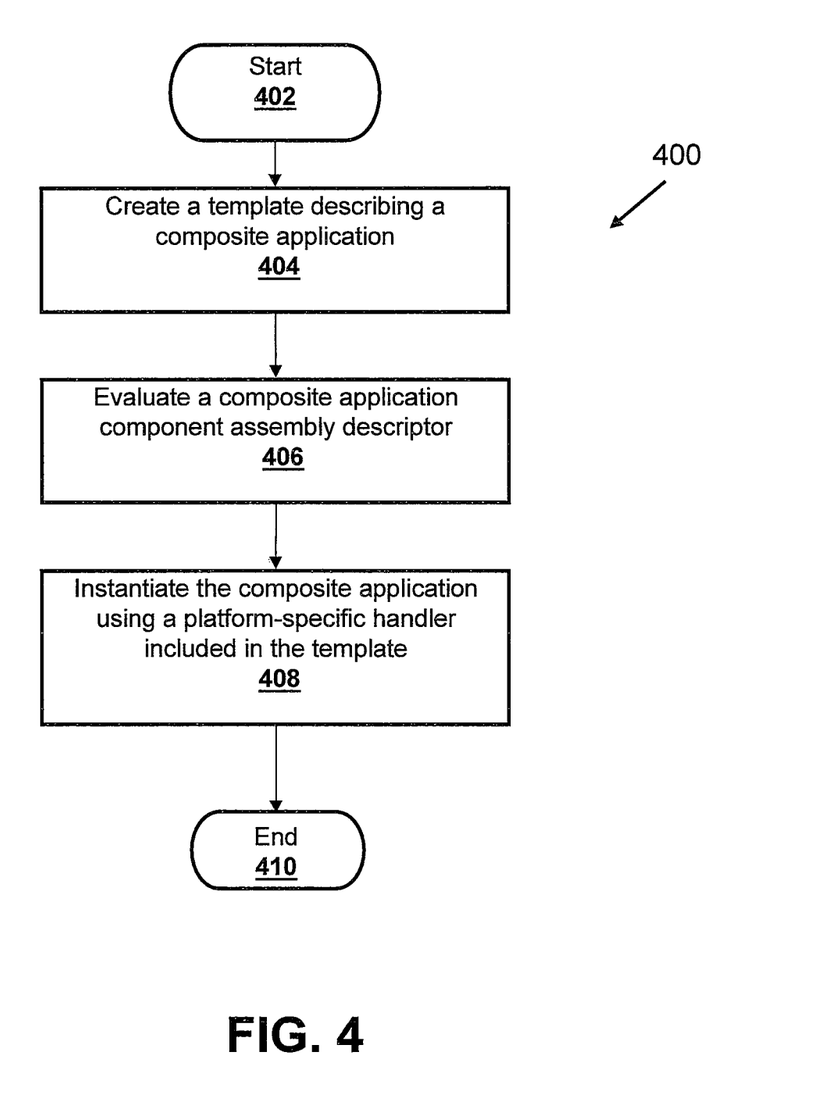
FIG. 4 is a high-level flow-chart of an exemplary method to instantiate a composite application for one of a plurality of different target platforms, according to an embodiment of the present invention.

FIG. 4 is a flow-chart 400 of an exemplary method containing steps for instantiating a composite application for one of a plurality of different target platforms. According to the present invention, the exemplary method in FIG. 4 is implemented in DCAI utility 148 of FIG. 1 and exemplary illustrations 200 and 300 of FIGS. 2 and 3, respectively. After initiator block 402, template 208 is created, as depicted in block 404. Template 208 describes composite application 203 in a generic and abstracted manner, independent of target platform 306-312. In one embodiment, template 208 is included within composite application package 312, which includes (i) composite application component assembly descriptor for listing each application component 204 of composite application 203 and describing the functionality of each application component 204, and (ii) one or more platform-specific handlers for deploying composite application components for a plurality of different target platforms 306-312.

From block 404, the method continues to block 406, where composite application component assembly descriptor is evaluated to identify platform-specific implementations of composite application components 204. The evaluation is performed by deployment mechanism 322. As a result, the applicability of a composite application package 320 for multiple different target platforms is increased. Each distinct implementation is targeted for a specific target platform to which composite application 203 is deployed. In this regard, the abstracted description in template 208 is mapped to specific elements of the supported target platforms. For example, a page user interface (UI) would be mapped to an Eclipse API if the composite application is deployed on Rich Client runtime 306. In another example, however, the same page UI would be mapped to a Portal page if the composite application is deployed on Portal Server runtime 308. Thus, depending on the target system, application components 302 can include different implementations, which are leveraging different runtime APIs.

After evaluating composite application component assembly descriptor, composite application 203 is then instantiated, as depicted in block 408. In this regard, composite application 203 is instantiated for deployment to a particular target platform using platform-specific handler 302 included in template 208. As a result, there is no need to have the necessary target platform handlers pre-deployed to the target platform in advance of deployment of composite application 203. In one embodiment, the platform-specific handler is invoked for deployment. CAI 212 of the runtime target platform manages the individual application components as part of the composite application. Moreover, CAI 212 supports deployment, versioning, and updating of application components 204. The method ends at termination block 410.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of instantiating a composite application for one of a plurality of different target platforms, said method comprising:
   in an application assembly environment, creating a plurality of templates each describing, in a platform-independent manner, a respective one of a plurality of composite applications, wherein each of the plurality of templates is stored as a markup language file that includes:
      a composite application component assembly descriptor listing a respective set of multiple application components selected from among a common collection of a plurality of application components and defining desired interactions between the multiple application components in the set of application components to achieve a desired program logic of that template;
      meta-data defining specific configuration settings for each application component of the template; and
      access control information;
   storing the plurality of templates in a template catalog and providing access to the plurality of templates in the template catalog to a user community;
   in response to user interaction of multiple users in the user community invoking a template instantiation service, creating multiple different user-specific versions of a composite application from a particular template among the plurality of templates in the template catalog without requiring any of the multiple users to hold administrative authority for the particular template;
   packaging a particular version of the composite application among the multiple different user-specific versions of the composite application by building a composite application package including the particular template, the respective set of application components of the particular template,
      and a plurality of platform-specific handlers each executable to install the respective set of application components on a respective one of said plurality of different target platforms;
   at a runtime environment executing on a particular target platform among a plurality of different target platforms:
      evaluating said composite application component assembly descriptor of the particular version of the composite application to identify platform-specific implementations of said set of application components of the particular version of the composite application, the evaluating including mapping features of the particular version of the composite application described by the composite application component assembly descriptor to elements of the particular target platform; and
      instantiating said particular version of the composite application in the runtime environment using the particular platform-specific handler included in said template for platform-specific deployment of the particular version of the composite application on the particular target platform.

2. The method of claim 1, wherein the plurality of application components are selected from a set including JAVA classes, portlets, Enterprise JAVA Beans (EJBs), processes, and Plain Old JAVA Objects (POJOs).

3. The method of claim 1, wherein:
   the plurality of application components includes portlets; and
   the interactions defined by the template include wires between portlets.

4. A program product, comprising:
   a computer-readable storage device; and
   a Dynamic Composite Application Instantiation (DCAI) utility, stored within the computer-readable storage device, wherein the DCAI utility includes:
      program code that, when executed by a processor, creates a plurality of templates each describing, in a platform-independent manner, a respective one of a plurality of composite applications and stores each of the plurality of templates in a template catalog in a respective markup language file that includes:
         a composite application component assembly descriptor listing a respective set of multiple application components selected from among a common collection of a plurality of application components and defining desired interactions between the multiple application components in the set of application components to achieve a desired program logic of that template;
         meta-data defining specific configuration settings for each application component of the template; and
         access control information;
      program code that provides access to the plurality of templates in the template catalog to a user community;
      program code that, in response to user interaction of multiple users in the user community invoking a template instantiation service, creates multiple different user-specific versions of a composite application from a particular template among the plurality of templates in the template catalog without requiring any of the multiple users to hold administrative authority for the particular template;
      program code that packages a particular version of the composite application among the multiple different user-specific versions of the composite application by building a composite application package including the particular template, the respective set of application components of the particular template, and
         a plurality of platform-specific handlers each executable to install the respective set of application components on a respective one of said plurality of different target platforms;
      program code stored within the computer-readable storage device that, when executed within a runtime environment on a particular target platform among the plurality of different target platforms, causes the particular target platform to perform:

evaluating said composite application component assembly descriptor of the particular version of the composite application to identify platform-specific implementations of said set of application components of the particular version of the composite application, the evaluating including mapping features of the particular version of the composite application described by the composite application component assembly descriptor to elements of the particular target platform; and     instantiating said particular version of the composite application using a particular one of said plurality of platform-specific handlers included in said template for platform-specific deployment of the particular version of the composite application on the particular target platform.

5. The program product of claim 4, wherein the plurality of application components are selected from a set including JAVA classes, portlets, Enterprise JAVA Beans (EJBs), processes, and Plain Old JAVA Objects (POJOs).

6. The program product of claim 4, wherein:

the plurality of application components includes portlets; and the interactions defined by the template include wires between portlets.

7. A data processing system, comprising:

at least one processor unit;

data storage; and a Dynamic Composite Application Instantiation (DCAI) utility stored within the data storage, wherein the DCAI utility includes:

program code that, when executed by a processor, creates a plurality of templates each describing, in a platform-independent manner, a respective one of a plurality of composite applications and stores each of the plurality of templates in a template catalog in a respective markup language file that includes:

a composite application component assembly descriptor listing a respective set of multiple application components selected from among a common collection of a plurality of application components and defining desired interactions between the multiple application components in the set of application components to achieve a desired program logic of that template;

meta-data defining specific configuration settings for each application component of the template; and         access control information;

program code that provides access to the plurality of templates in the template catalog to a user community;

program code that, in response to user interaction of multiple users in the user community invoking a template instantiation service, creates multiple different user-specific versions of a composite application from a particular template among the plurality of templates in the template catalog without requiring any of the multiple users to hold administrative authority for the particular template;

program code that packages a particular version of the composite application among the multiple different user-specific versions of the composite application by building a composite application package including the particular template, the respective set of application components of the particular template, and         a plurality of platform-specific handlers each executable to install the respective set of application components on a respective one of said plurality of different target platforms program code stored within the computer-readable storage device that, when executed by the at least one processor unit, causes the data processing system to perform:

evaluating said composite application component assembly descriptor of the particular version of the composite application to identify platform-specific implementations of said set of application components of the particular version of the composite application, the evaluating including mapping features of the particular version of the composite application described by the composite application component assembly descriptor to elements of the particular target platform; and instantiating said particular version of the composite application in a runtime environment of the data processing system using the particular platform-specific handler included in said template for platform-specific deployment of the particular version of the composite application on the particular target platform.

8. The data processing system of claim 7, wherein the plurality of application components are selected from a set including JAVA classes, portlets, Enterprise JAVA Beans (EJBs), processes, and Plain Old JAVA Objects (POJOs).

9. The data processing system of claim 7, wherein:

the plurality of application components includes portlets; and the interactions defined by the template include wires between portlets.

\* \* \* \* \*